US007516413B2

(12) United States Patent
Toh et al.

(10) Patent No.: US 7,516,413 B2
(45) Date of Patent: Apr. 7, 2009

(54) INFORMATION PROCESSING APPARATUS AND METHOD, AND PROGRAM THEREFOR

(75) Inventors: Yuichiro Toh, Tokyo (JP); Akira Ando, Kanagawa (JP); Kumiko Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 10/237,782

(22) Filed: Sep. 9, 2002

(65) Prior Publication Data

US 2003/0058284 A1    Mar. 27, 2003

(30) Foreign Application Priority Data

Sep. 11, 2001 (JP) ............................. 2001-275012

(51) Int. Cl.
*G06F 3/00* (2006.01)
(52) U.S. Cl. ...................................... 715/769; 715/716
(58) Field of Classification Search ................ 715/769, 715/716, 727, 812, 718
See application file for complete search history.

(56) References Cited

U.S. PATENT DOCUMENTS

| | | | | |
|---|---|---|---|---|
| 5,745,112 A | * | 4/1998 | Hirose | ........................ 715/769 |
| 5,838,384 A | * | 11/1998 | Schindler et al. | ............ 348/563 |
| 6,121,967 A | * | 9/2000 | Foster et al. | ................. 715/772 |
| 7,139,981 B2 | * | 11/2006 | Mayer et al. | ................. 715/771 |
| 2002/0109734 A1 | * | 8/2002 | Umezu et al. | ................ 345/846 |
| 2004/0001094 A1 | * | 1/2004 | Unnewehr et al. | ........... 345/769 |
| 2006/0265655 A1 | * | 11/2006 | Rosenberg | ................... 715/704 |

OTHER PUBLICATIONS

Anonymous, "Drag and drop available target indicator" RD Database No. 341044, Sep. 1992, Kenneth Mason Publications Ltd., p. 1.*

* cited by examiner

*Primary Examiner*—Dennis Bonshock
(74) *Attorney, Agent, or Firm*—Oblon, Spivak, McClelland, Maier & Neustadt, P.C.

(57) ABSTRACT

In order to record content on a hard disk drive to a source, when a source icon corresponding to the hard disk drive is dragged in a source icon section on a control bar in a display window, an arrow is added above an available source icon corresponding to an MD drive to which the content read from the hard disk drive can be supplied and recorded. An unavailable source icon corresponding to a source to which the content cannot be supplied and recorded is displayed in a grayed-out manner. When the dragged source icon is dropped onto the source icon corresponding to the MD drive, the content on the hard disk drive is read, and is recorded to an MD inserted in the MD drive.

10 Claims, 5 Drawing Sheets

INFORMATION PROCESSING APPARATUS AND METHOD, AND PROGRAM THEREFOR

BACKGROUND OF THE INVENTION

1. Field of the Invention

The present invention relates to an information processing apparatus and method, and a program therefor. In particular, the present invention relates to an information processing apparatus and method, and a program therefor, whereby the user operability can be improved.

2. Description of the Related Art

As personal computers have recently become widespread, such personal computers can be used to generate text or to access a server over the Internet to receive various kinds of information.

Various media including recording media such as CD (compact disc) and MD (Mini Disc) (trademark), and FM radios can be connected to a personal computer so that audio data (content) can be obtained, played, or edited from such media, or can be recorded onto another recording medium for entertainment purposes.

If the obtained audio data is recorded onto another recording medium, however, layers of the recording medium must be selected before reading and recording the audio data, in the same manner as a typical recording of image data or text data, which hinders the ease of use.

SUMMARY OF THE INVENTION

In view of such a background, it is an object of the present invention to provide an arrangement in which the user operability for recording content can be improved.

To this end, in an aspect of the present invention, an information processing apparatus includes a plurality of inputting and outputting units for inputting or outputting content, and a display control unit for controlling to display an icon corresponding to each of the plurality of inputting and outputting units. When one of the icons is dragged, the display control unit allows a user to know an available icon onto which the dragged icon can be dropped.

The display control unit may add an arrow to the available icon.

When a first icon is dragged-and-dropped onto a second icon, content output from the inputting and outputting unit corresponding to the first icon may be output to the inputting and outputting unit corresponding to the second icon.

The display control unit may cause an unavailable icon onto which the dragged icon cannot be dropped to be displayed in a grayed-out manner.

The display control unit may control to display the icons according to the state of the inputting and outputting units.

In another aspect of the present invention, an information processing method includes a plurality of inputting and outputting steps of inputting or outputting content, and a display control step of controlling to display an icon corresponding to each of the plurality of inputting and outputting steps. When one of the icons is dragged, the display control step enables a user to know an available icon onto which the dragged icon can be dropped.

In still another aspect of the present invention, a program causes a computer to execute a plurality of inputting and outputting steps of inputting or outputting content, and a display control step of controlling to display an icon corresponding to each of the plurality of inputting and outputting steps. When one of the icons is dragged, the display control step enables a user to know an available icon onto which the dragged icon can be dropped.

According to the present invention, therefore, when an icon is dragged, an available icon or icons onto which the dragged icon can be dropped can be displayed in such a manner that a user can recognize the available icon or icons, thereby improving the user operability when content is input and output.

DESCRIPTION OF THE PREFERRED EMBODIMENTS

Figure 1:
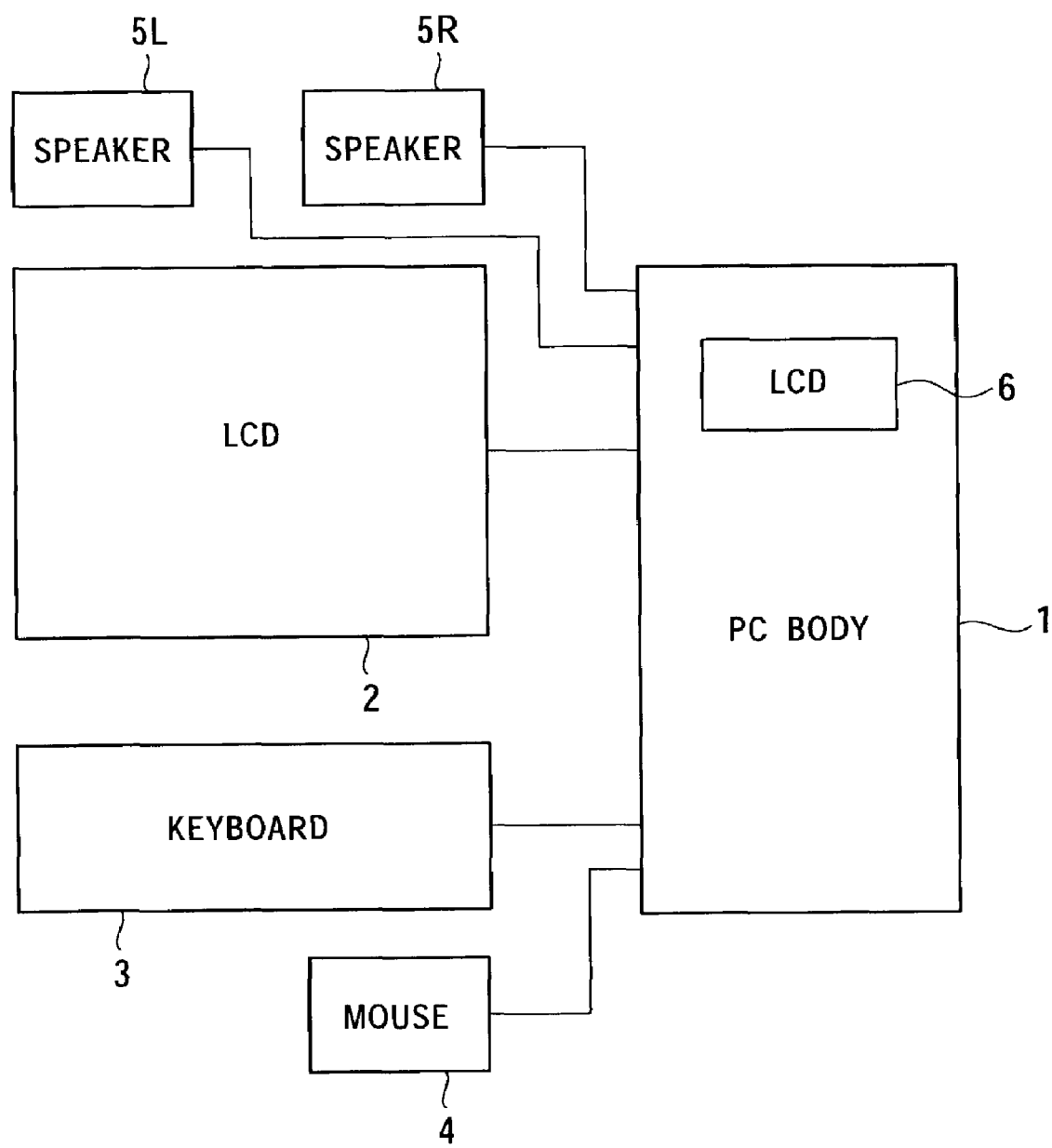
FIG. 1 is a schematic block diagram of a personal computer according to the present invention.

FIG. 1 shows the configuration of a personal computer (PC) according to the present invention. A PC body 1 is connected to a keyboard 3 and a mouse 4 which are operated by a user for various operations. The PC body 1 is also connected to an LCD (liquid crystal display) 2 for displaying various kinds of information. The PC body 1 is further connected to a pair of speakers 5L and 5R for outputting an audio signal in stereo. The PC body 1 incorporates another LCD 6 which is smaller than the LCD 2. The LCD 6 displays text indicating the title of the content that is being played back, and the name of the artist, etc.

Figure 2:
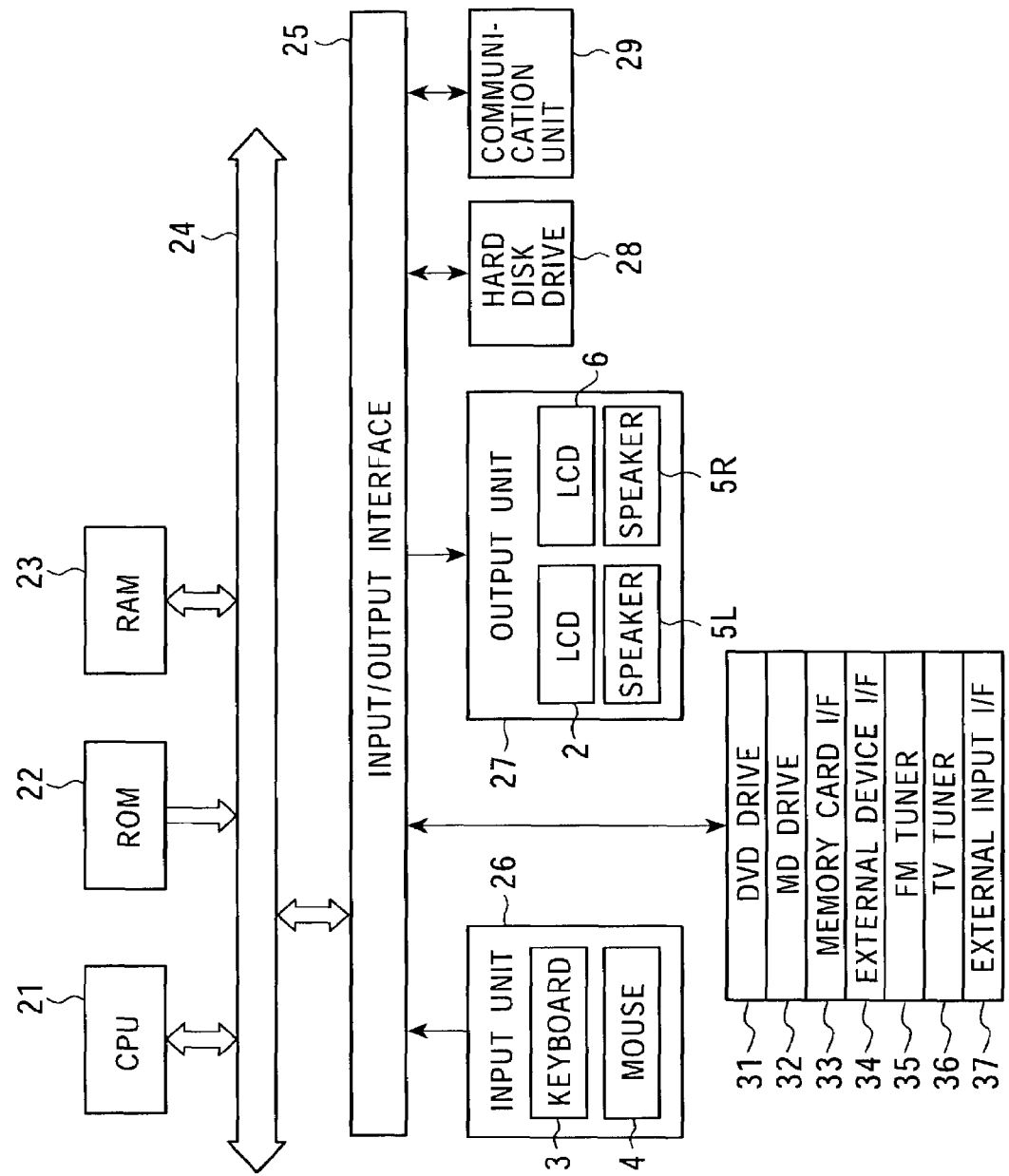
FIG. 2 is a schematic block diagram of internal components of the personal computer shown in FIG. 1.

FIG. 2 shows the configuration of internal components of the personal computer shown in FIG. 1. In FIG. 2, a CPU (central processing unit) 21 performs various kinds of processing according to a program stored in a ROM (read-only memory) 22, or a program loaded into a RAM (random access memory) 23 from a hard disk drive 28. The RAM 23 also stores, if necessary, data necessary for the CPU 21 to perform the various kinds of processing.

The CPU 21, the ROM 22, and the RAM 23 are connected to each other via a bus 24. An input/output interface 25 is also connected to the bus 24.

Connected to the input/output interface 25 are an input unit 26 including the keyboard 3 and the mouse 4; an output unit 27 including the LCDs 2 and 6, and the speakers 5L and 5R; the hard disk drive 28; and a communication unit 29 including a modem and a terminal adapter. The communication unit 29 performs communication over a network including the Internet.

Also connected to the input/output interface 25 are a DVD drive 31, an MD (Mini Disc) drive 32, a memory card interface (I/F) 33, an external device interface (I/F) 34, an FM tuner 35, a TV tuner 36, and an external input interface 37.

The DVD drive 31 plays back a DVD (digital versatile disc) or a CD (compact disc) loaded therein, or plays back a CD-R (Compact Disk Recordable) loaded therein. The DVD drive 31 further records audio data input from the MD drive 32, the memory card interface 33, the external device interface 34, the FM tuner 35, the TV tuner 36, or the external input interface 37. The DVD drive 31 may also record audio data played from the hard disk drive 28.

The MD drive 32 records or plays back audio data recorded on an MD (Mini Disc) loaded therein.

The memory card interface 33 is adapted to write or read data to or from a memory card such as a memory stick (trademark).

The external device interface 34 interfaces with a connected external device. The FM tuner 35 receives FM broadcasts. The TV tuner 36 receives television broadcasts. The external input interface 37 receives an input signal from an external device.

Accordingly, the personal computer is capable of outputting data from one of the DVD drive 31, the MD drive 32, the memory card interface 33, the external device interface 34, the FM tuner 35, the TV tuner 36, the external input interface 37, and the hard disk drive 28, and of transferring the output data to another device for recording.

Figure 3:
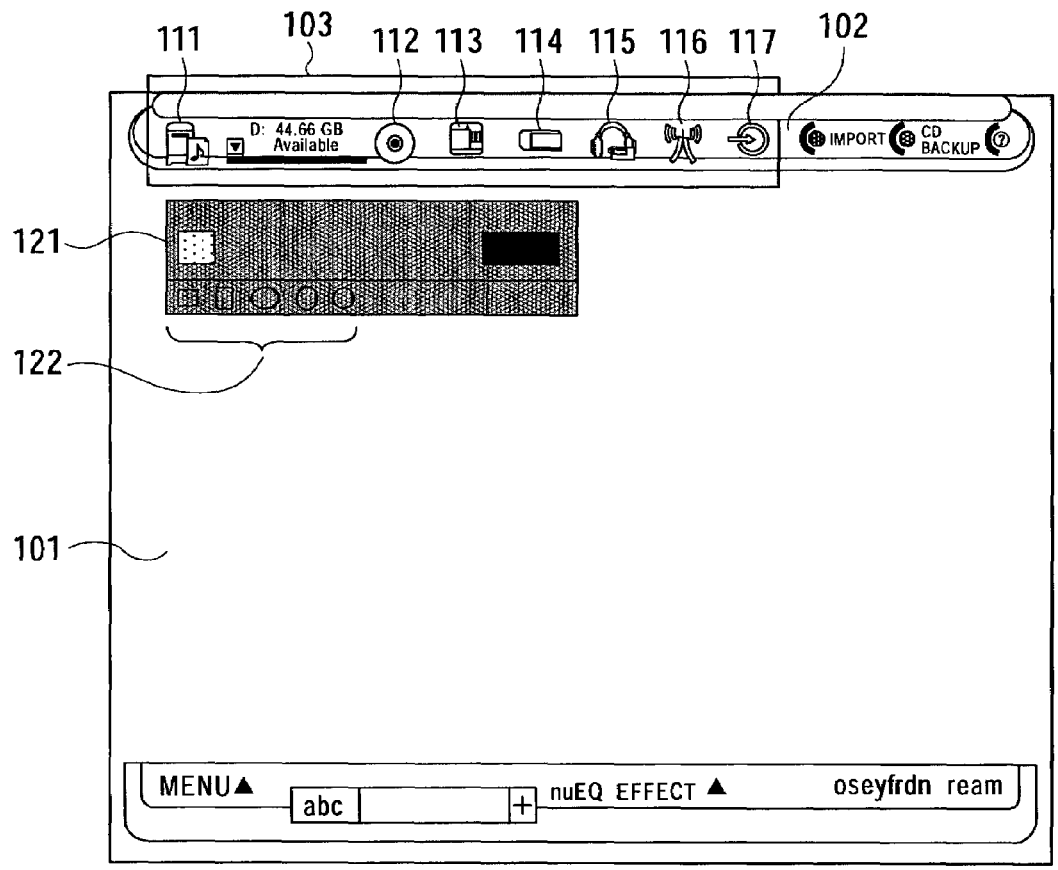
FIG. 3 is a representation of an example display of a main window.

A main window 101 displayed on the LCD 2 when the PC body 1 is powered on is described with reference to FIG. 3.

The main window 101 is provided with a control bar 102 on an upper portion thereof. The control bar 102 includes a source icon section 103 having source icons 111 to 117 which are normally displayed in gray. The source icons 111 to 117 correspond to the hard disk drive 28, the DVD drive 31, the MD drive 32, the memory card interface 33, the external device interface 34, the FM tuner 35, and the external input interface 37, respectively. A user can only choose one from the icons 111 to 117 to select a source device (a device for outputting content such as audio data, in this example).

It is assumed herein that a CD is inserted into the DVD drive 31, by way of example. When the source icon 112 corresponding to the DVD drive 31 is selected, a playback panel 121 shown in FIG. 3 is displayed. The user can operate an operating unit 122 on the playback panel 121 to play back the CD inserted in the DVD drive 31.

Figure 4:
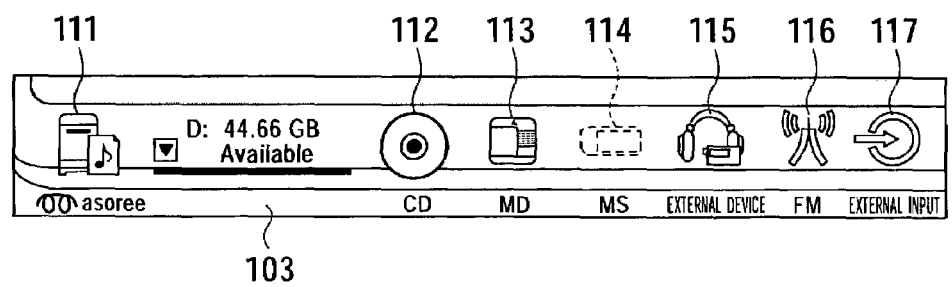
FIG. 4 is a representation of a source icon section in the main window.

When the CD inserted in the DVD drive 31 is being played back, as shown in FIG. 4, the source icon 112 corresponding to the DVD drive 31 is distinctively displayed in a different color, such as blue, from the other source icons. This enables the user to readily know that the CD in the DVD drive 31 is being played back.

If, for example, no medium (memory card) is inserted in the memory card interface 33, the source icon 114 corresponding to the memory card interface 33 is displayed in a grayed-out manner (in a non-selectable mode). This enables the user to readily know that no memory card is inserted in the memory card interface 33 and that the source icon 114 is not selectable.

Figure 5:
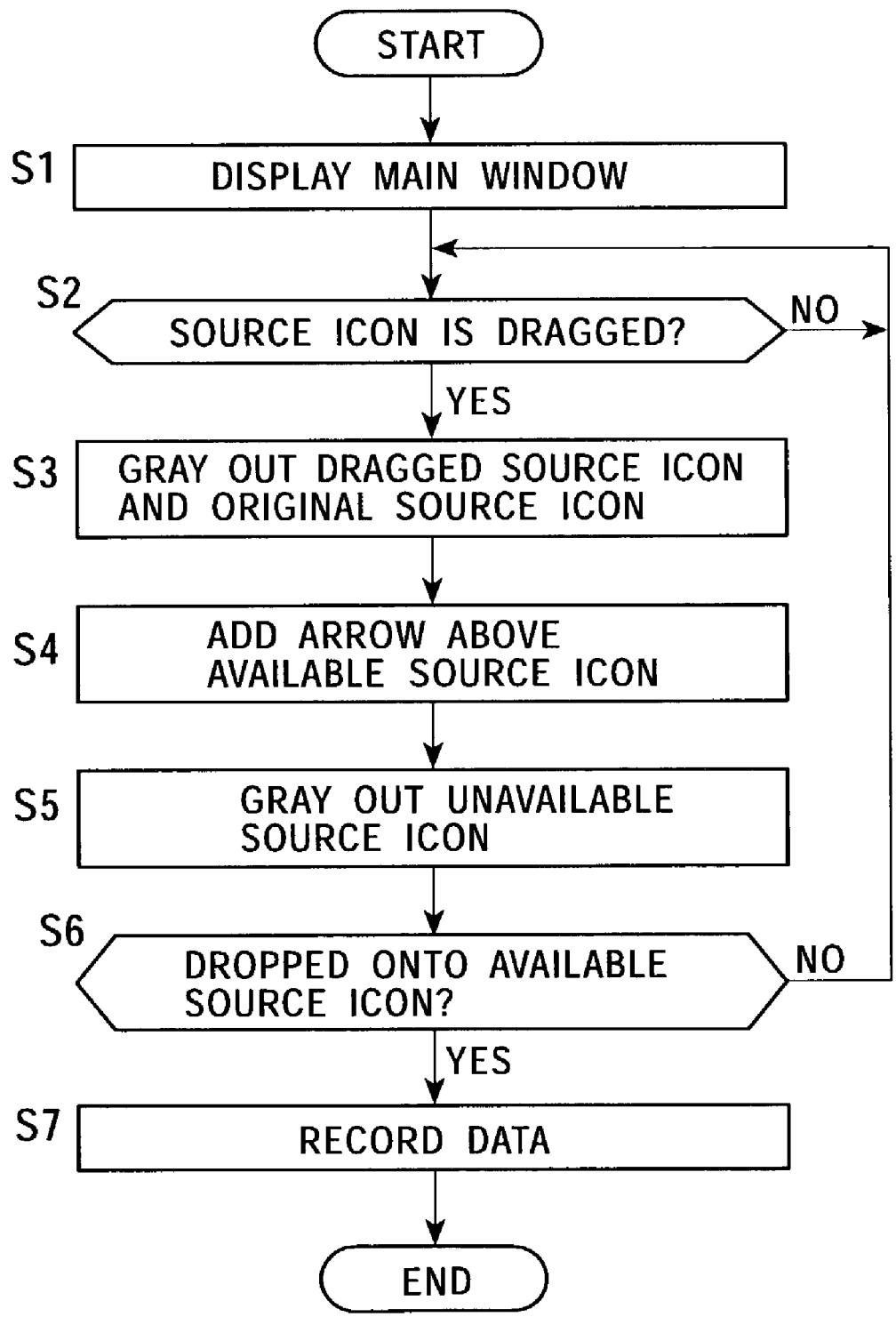
FIG. 5 is a flowchart showing a recording process for the personal computer shown in FIG. 1.

A process to supply data obtained from a source to another source (recording medium) for recording is now described with reference to the flowchart in FIG. 5. It is assumed herein that data (content) recorded on the hard disk drive 28 is supplied and recorded to an MD inserted in the MD drive 32.

In step S1, the CPU 21 causes the main window 101 (shown in FIG. 3) to be displayed on the LCD 2 when the PC body 1 is powered on.

In step S2, the CPU 21 waits until any selectable source icon from the source icons 111 to 117 is dragged. When a source icon is dragged, in step S3, the dragged source icon and the source icon located at the original position are grayed out.

In step S4, the CPU 21 causes an arrow to be added above an available source icon corresponding to a source to which the data from the source corresponding to the dragged source icon can be supplied (recorded). In step S5, the CPU 21 further causes an unavailable source icon corresponding to a source to which the data cannot be supplied (recorded), which is not suitable as a destination, to be grayed out.

Figure 6:
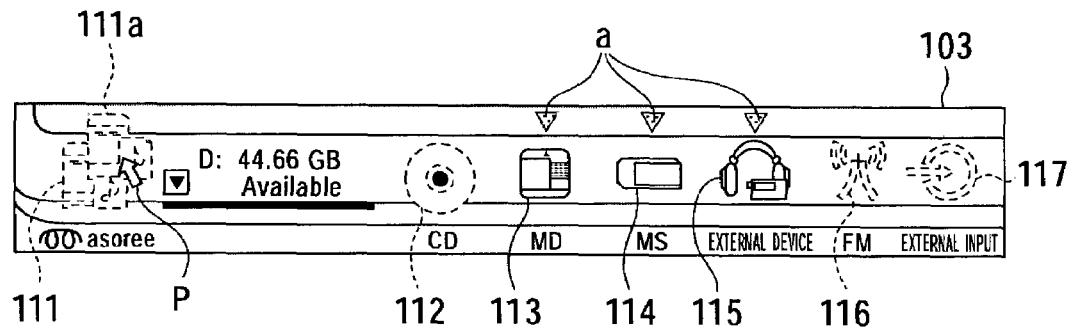
FIG. 6 is a representation of a source icon section in the main window.

For example, if the user operates the mouse 4 to drag the source icon 111 corresponding to the hard disk drive 28 using a pointer (mouse cursor) p, the source icon section 103 shown in FIG. 6 is presented on the control bar 102. The source icon 111a which is being dragged using the pointer p and the source icon 111 located at the original position are displayed in a grayed-out manner.

The source icon 113 corresponding to the MD drive 32 having an MD inserted therein, the source icon 114 corresponding to the memory card interface 33 having a memory stick inserted therein, and the source icon 115 corresponding to the external device interface 34 indicating a connection of an external recordable device are displayed in gray, as normal, above which arrows "a" are added. Thus, the user is able to know that the data in the hard disk drive 28 indicated by the source icon 111 can be supplied to any of the sources corresponding to the source icons 113 to 115.

The source icon 112 corresponding to the DVD drive 31 having a non-recordable CD inserted therein, the source icon 116 corresponding to the FM tuner 35, and the source icon 117 corresponding to the external input interface 37 are displayed in a grayed-out manner since the data cannot be supplied (recorded) to the corresponding sources. This enables the user to know that the sources indicated by the source icons 112, 116, and 117 are unrecordable devices (unavailable devices to which the data cannot be supplied), and that the source icon 111a dragged using the pointer p cannot be dropped onto the source icons 112, 116, and 117.

If a recordable CD-R or CD-RW (Compact Disk ReWritable) is inserted in the DVD drive 31, the source icon 112 corresponding to the DVD drive 31 is displayed in gray, as normal, above which the arrow "a" is added.

Figure 7:
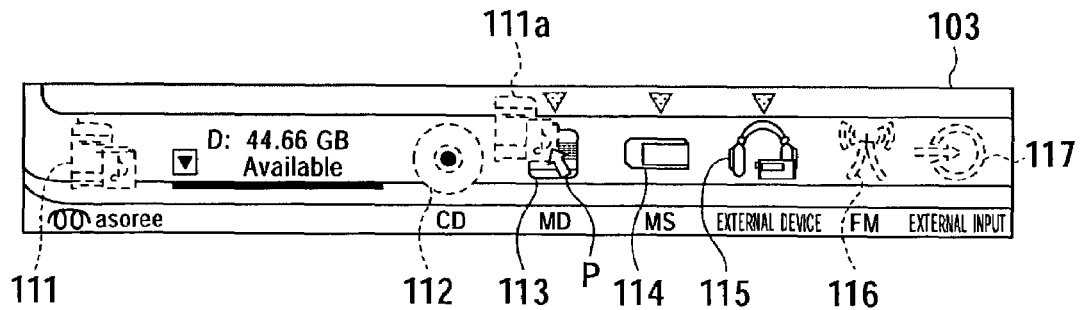
FIG. 7 is a representation of a source icon section in the main window.

Referring to FIG. 7, the user drops the source icon 111a dragged using the pointer p onto an available source icon for a recordable device (in this example, the source icon 113 corresponding to the MD drive 32). With this operation, in step S6, the CPU 21 determines whether or not the source icon 111a dragged using the pointer p is dropped onto an available source icon for a recordable device. If it is determined that the source icon 111a is dropped, the process proceeds to step S7, in which the data recorded on the hard disk drive 28 is read, and is supplied to the MD drive 32 so as to enable a step of recording the data to the MD inserted therein.

This recording step may be performed immediately by pre-settings; the CPU 21 controls the hard disk drive 28 to obtain content to be recorded, causes the obtained content to be supplied to the MD, and controls the MD drive 32 to record the content therein. Otherwise, a record-setting panel (not shown) may be displayed for settings necessary for recording.

If it is determined in step S6 that the source icon 111a dragged using the pointer p is not dropped onto the available source icon, i.e., if the source icon 111a is dropped onto a location other than the available source icon, the process returns to step S2, in which the CPU 21 repeats the processing subsequent thereto.

According to the present invention, therefore, when a source icon corresponding to a source which can output content is dragged, an arrow is added above a source icon corresponding to a source to which the content can be input, while the other source icons corresponding to sources to which the content cannot be input are displayed in a grayed-out manner, thereby allowing a user to readily know an available source (recording medium) to which the content can be input. The user can therefore input desired content with ease. The user operability when content is input and output can thus be improved.

A source icon is displayed in different fashions according to the state of the corresponding source, such as the presence or absence of medium, the state where the source is in playback, or the state where the source is recording, thereby allowing a user to readily know the state of the source.

The above-described process may be executed not only in hardware but also in software. If the process is executed in software, a program constituting the software may be installed from a network or a recording medium to a computer incorporated in special hardware, or to a general-purpose personal computer capable of performing various kinds of functionality by installing various programs.

It is to be understood that the step for describing the program provided by the recording medium, as defined herein, encompasses not only a routine executed in a time-series manner according to the sequence described, but also a routine executed in parallel or in a discrete manner if the routine is not necessarily performed in a time-series manner.

What is claimed is:

1. An information processing apparatus comprising:
   a plurality of input and output units configured to input or output music or video content;
   a display control unit configured to control display of a plurality of icons, each icon corresponding to one of the plurality of input and output units; and
   a transfer control unit configured to automatically generate a record-setting panel for display that provides settings used for recording upon receiving a command indicating a first icon is dragged-and-dropped onto a second icon, in cooperation with the display control unit which displays settings necessary for the transfer of music or video content between the input unit and output unit, and to control the transfer of music or video content between the input and output units so that the music or video content of the input unit corresponding to the first icon is transmitted to the output unit corresponding to the second icon, the transfer control unit controlling a dragging operation in cooperation with the display control unit to designate at least one available icon onto which the dragged icon can be dropped, the availability of the at least one icon being based upon a hardware state of the output unit corresponding to the at least one icon, the display control unit highlighting the available icons by placing an arrow above each available icon indicating the corresponding hardware state, and that at least one icon is displayed in a different fashion according to state of the input,
   wherein the at least one icon is designated as available when the hardware state is such that a dragged icon being dropped on the at least one icon would result in an output operation being commenced.

2. An information processing apparatus according to claim 1, wherein the display control means causes an unavailable icon onto which the dragged icon cannot be dropped to be displayed in a grayed-out manner.

3. The information processing apparatus according to claim 1, wherein at least one of the output units is a portable media player connected to the computer.

4. The information processing apparatus according to claim 1, wherein the hardware state of the corresponding output unit corresponds to a state in which there is an absence of a recordable medium in the output unit.

5. The information processing apparatus according to claim 1, wherein the hardware state of the corresponding output unit corresponds to a state in which there is an absence of any medium in the output unit.

6. The information processing apparatus according to claim 1, wherein the hardware state of the corresponding output unit corresponds to a state in which no additional capacity is available on a recordable medium in the output unit.

7. The information processing apparatus according to claim 1, wherein the hardware state of the corresponding output unit corresponds to a state in which the output unit is already in the midst of a recording process.

8. An information processing method comprising:
   inputting or outputting music or video content;
   displaying a plurality of icons, each icon corresponding to one of the plurality of input and output devices;
   transferring music or video content between the input and output devices so that, upon receiving a command indicating a first icon is dragged-and-dropped onto a second icon, the music or video content of the input device corresponding to the first icon is transmitted to the output device corresponding to the second icon;
   automatically generating a record-setting panel for display that provides settings used for recording upon receiving the dragged-and-dropped command in cooperation with the display controller which displays settings necessary for the transfer of music or video content between the input and output devices;
   designating at least one available icon onto which the dragged icon can be dropped, the availability of the at least one icon being based upon a hardware state of the output device corresponding to the at least one icon;
   highlighting the available icons by placing an arrow above each available icon indicating the corresponding hardware state, and that at least one icon is displayed in a different fashion according to a state of the input,
   wherein the at least one icon is designated as available when the hardware state is such that a dragged icon being dropped on the at least one icon would result in an output operation being commenced.

9. The information processing method according to claim 8, wherein at least one of the output devices is a portable media player connected to the computer.

10. A computer readable storage medium including computer program instructions that cause a computer to implement an information processing method comprising:
    inputting or outputting music or video content;
    displaying a plurality of icons, each icon corresponding to one of the plurality of input and output devices;
    transferring music or video content between the input and output devices so that, upon receiving a command indicating a first icon is dragged-and-dropped onto a second icon, the music or video content of the input device corresponding to the first icon is transmitted to the output device corresponding to the second icon;
    automatically generating a record-setting panel for display that provides settings used for recording upon receiving the dragged-and-dropped command in cooperation with the display controller which displays settings necessary for the transfer of music or video content between the input and output devices;
    designating at least one available icon onto which the dragged icon can be dropped, the availability of the at least one icon being based upon a hardware state of the output device corresponding to the at least one icon;
highlighting the available icons by placing an arrow above each available icon indicating the corresponding hardware state, and that at least one econ is displayed in a different fashion according to a state of the input, wherein the at least one icon is designated as available when the hardware state is such that a dragged icon being dropped on the at least one icon would result in an output operation being commenced.

* * * * *